UNITED STATES PATENT OFFICE.

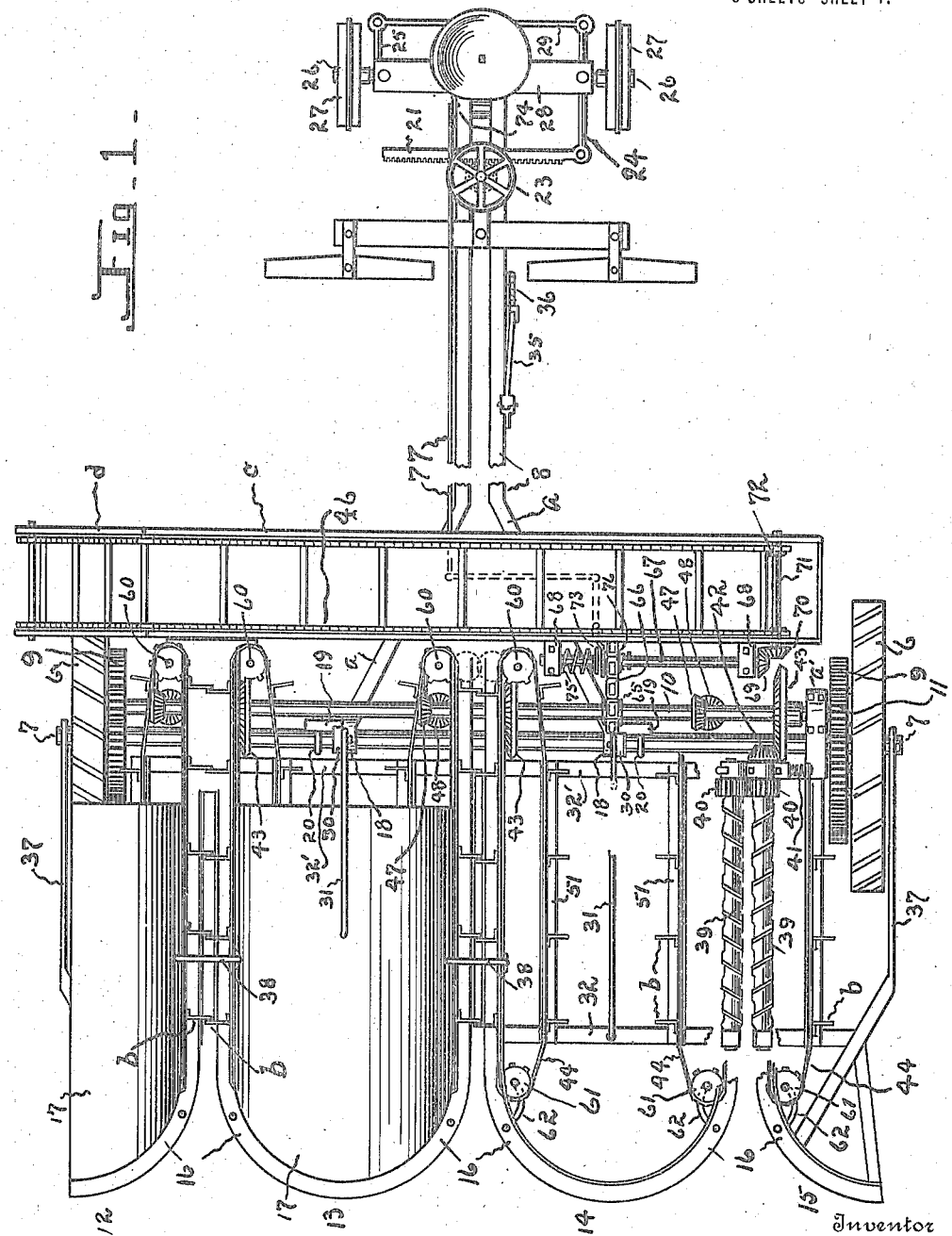

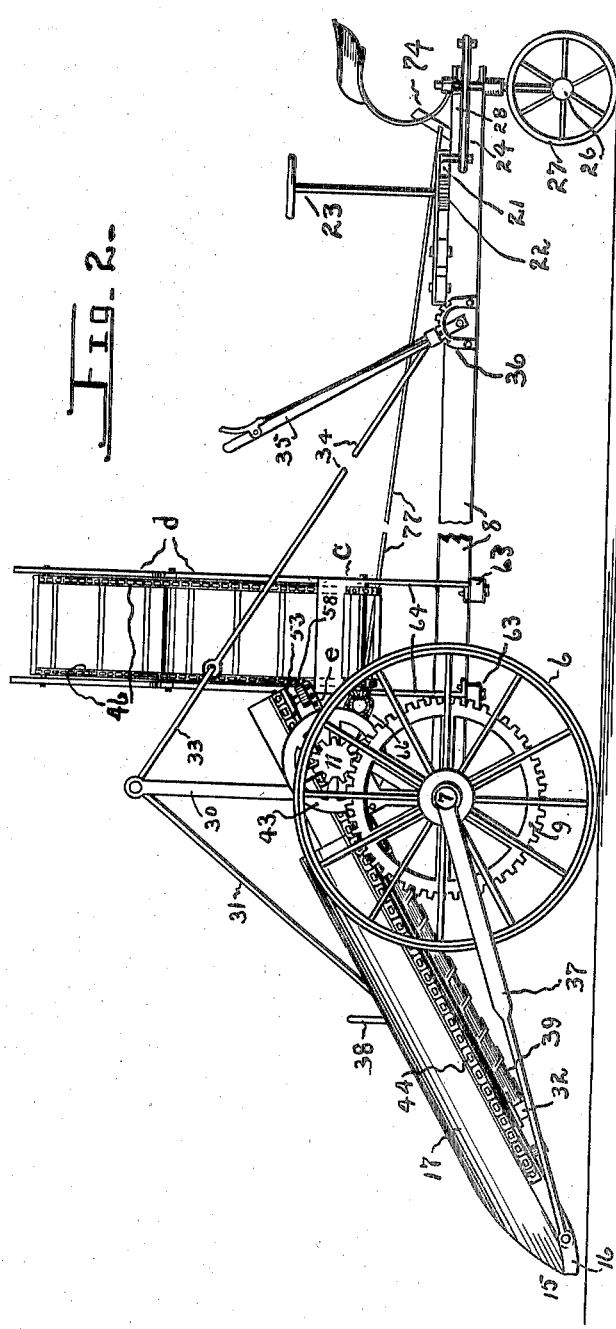

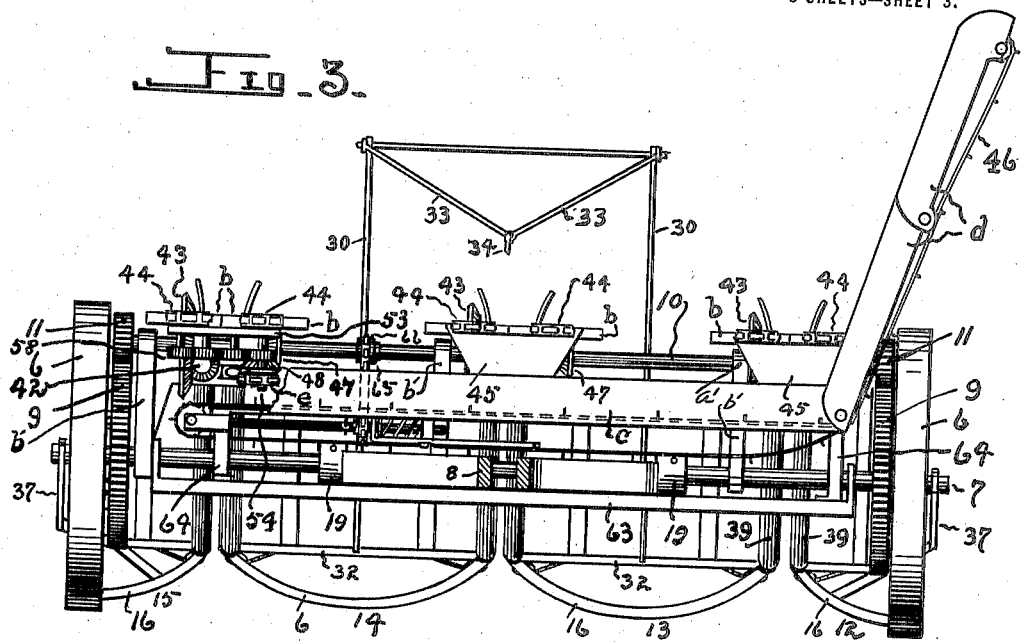
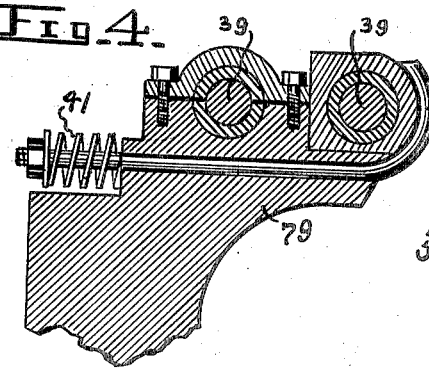
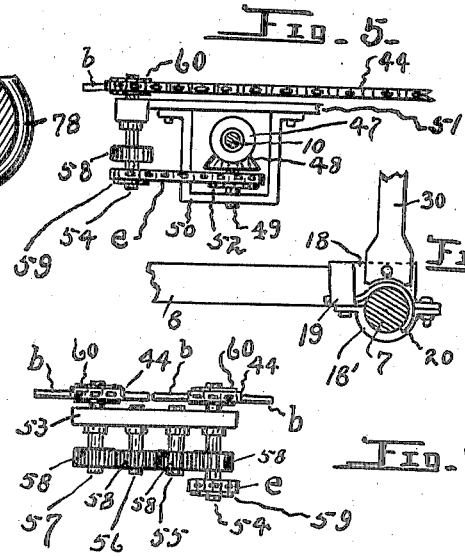

EUGENE G. BARKER, OF GLENWOOD, IOWA.

CORN-HARVESTER.

1,345,527.  Specification of Letters Patent.  Patented July 6, 1920.

Application filed August 30, 1918. Serial No. 252,039.

*To all whom it may concern:*

Be it known that I, EUGENE G. BARKER, a citizen of the United States, residing at Glenwood, in the county of Mills and State of Iowa, have invented certain new and useful Improvements in Corn-Harvesters, of which the following is a specification.

This invention relates to a corn harvester, of the class adapted to be driven through a field for removing the ears from the stalks and has for its object to provide a machine for the purpose which will be durable and free from complications. The novel features of construction are fully described hereinafter and are specifically pointed out in the appended claim and are illustrated in the accompanying drawing, wherein,—

Figure 1 is a plan view of the machine, parts being removed and broken away to clearly show construction. Fig. 2 is a view of the same in side elevation. Fig. 3 is a rear view of the machine. Figs. 4, 5, 6, and 7 relate to details. Fig. 4 is a sectional view showing the preferred mounting for a pair of rollers. Fig. 5 is a view showing means for communicating a rotatable movement from the operating shaft to a pair of carriers. Fig. 6 illustrates the mounting of the tongue on the axle. Fig. 7 shows a nest of gears for communicating a rotatable movement to a pair of carriers from the operating shaft.

Describing the construction in detail, the conventional vehicle-wheels, axle and vehicle steering pole are respectively indicated at 6, 7 and 8, the arrangement, in the present instance being, that the machine is to be moved forwardly for removing the ears of corn from three rows, a movement for the operating mechanism being derived from the pair of main gear wheels 9 which are rigidly secured to the hubs of the wheels 6.

Numeral 10 indicates an operating shaft disposed parallel with and above the axle and revoluble by the revoluble movement of the wheels 6 since it is provided with a pair of pinions 11 in engagement with the gear wheels 9. The operating shaft as best shown in Fig. 3 has bearings in the heads $a'$ of a plurality of upright links $b'$, these links having bearings upon the axle.

I provide a plurality of deflecting or alining-members 12, 13, 14 and 15, which project forwardly from the axle, each consisting of a U-shaped frame 16 having its convexed end disposed at the front, and provided with a hood 17, the width of the deflecting members 13 and 14 and their frame and hoods being nearly equal to the distance between the rows of corn, and when the harvester is driven through a field, the deflecting-members being between the rows, the stalks of corn will be moved into line between the adjacently disposed U-shaped frames 16 and their hoods.

The steering pole 8 is preferably of Y-shape, and as best shown in Fig. 1, the inner ends of its arms $a$ are provided with bearing-blocks 18 for a removable mounting on the axle, said blocks preferably being provided as best shown in Fig. 6, with removable bearing-plates 18', each block 18 being disposed equidistant from a wheel 6.

Since the harvester must be "turned about" at the ends of the corn-rows, the arms $a$ of the steering pole are each provided with projections 19 which extend in a direction of an adjacent wheel 6, and is provided with a staple 20 for engaging the axle, and as described, stresses when moving upon curves are sustained to advantage by the steering pole.

It will be appreciated that means for steering the machine is an important feature so that all of the corn may be harvested, and this is accomplished by a rack bar 21 in engagement with the toothed gear 22 which is revoluble by the steering wheel 23 and its shaft under control of a driver or operator, the rack-bar being adapted to actuate a rock-lever 24 and a lever 25, these levers being rigidly connected with the stub-axles 26 of the respective wheels 27 for the rear end of the tongue, said axles having a pivotal mounting for their inner ends in a cross-plate 28 carried by the tongue, the levers 24 and 25 being connected by a link 29, and by means of these parts, the harvester may be guided so that the frames 16 and their hoods will be suitably disposed between the rows.

In order that the alining-members 12, 13, 14 and 15 may be maintained somewhat above the ground in an inclined position, and that their weight and stresses directed thereto may, in part, be sustained by the steering pole 8, and that said alining-members may be swung upwardly under control of an operator whenever required, I provide the pair of standards 30, their lower ends having a pivotal connection with the bearing-blocks 18 of the steering pole, a pair of truss-rods 31 being provided to project forwardly of the standards for a connection with a pair of cross-bars 32, which are disposed below a frame 16 of each alining-member 13 and 14, truss-rods 33 being also provided to project convergingly and rearwardly from the standards, said rods 33, at their junction being provided with a rod 34 which is pivotally connected at its rear end with an operating-lever 35, a sector 36 being mounted on the steering pole to be engaged by the pawl of said operating-lever, and as described, the alining members may be under control of an operator to be elevated or lowered, and also to be maintained a desired distance from the ground. Numerals 32' indicate cross-bars which are disposed adjacent to the inner ends of the rectilinear arms of the frames 16 for connecting said arms.

Numerals 37 indicate a pair of links, each having its inner end pivotally connected with the axle, its outer end being connected with a frame 16 of an alining-member 12 or 15. Numerals 38 indicate deflecting-loops of inverted U-shape these loops being so mounted at their lower ends that they rigidly connect the adjacently disposed frames 16, and by operation of the lever 35, the links 37, standards 30 and all of the frames 16 together with their hoods, may have coincident swinging movements, to dispose said frames 16 and their hoods at a required distance above the ground.

In order that the ears of corn may be separated from the stalks and may be conducted rearwardly and discharged from the machine, certain mechanism is employed. Numerals 39 indicate rollers arranged in pairs, the rollers of each pair being disposed adjacent to each other below the rectilinear arms of the U-shaped frames 16, their front ends having journaled bearings in the crossbars 32. The rear ends of the rollers of each pair are provided with pinions 40 normally in engagement by means of a spring 41, and as best shown in Fig. 1, one of the rollers of each pair is provided with a miter gear 42 in engagement with a miter gear 43, in the present instance three of these gears 43 being employed and mounted on the operating-shaft 10, and by this construction, when the machine moves forwardly, the rollers 39 of each pair will rotate reversely, the corn stalks being engaged by and carried downwardly between the rollers, and the ears being detached from the stalks and deposited on the adjacent rectilinear arms of the frames 16.

The ears of corn thus detached are moved rearwardly by means of the endless carriers 44. In the present instance six endless carriers 44 are employed each preferably consisting of a sprocket-chain and provided with horizontal fingers $b$ arranged to be moved rearwardly upon an arm of a frame 16 for conducting the detached ears of corn to a hopper or slide 45, and through the slide to a transverse carrier 46 movable in a suitable frame consisting of a horizontal part $c$ and inclined, foldable part $d$, the ears of corn being discharged from the harvester by the carrier 46.

The mechanism for moving the endless carriers 44 consists, in part, of the miter gears 47 which are mounted on the operating shaft 10, in the present instance three of these gears being employed. Each miter gear 47 is engaged by a miter gear 48 having a wrist pin 49 (best shown in Fig. 5), each wrist-pin 49 being mounted in a hanger 50, and each hanger 50 being mounted on one of the inclined strips 51 of the machine frame (Figs. 1–5), the wrist-pin 49 being provided with a sprocket wheel 52 on which is mounted a sprocket chain $e$.

Journaled in each cross-piece 53 of a pair of adjacent frame-strips 51 are wrist-pins 54, 55, 56 and 57 (Fig. 7.), employed in series, each being provided with a toothed gear 58, in the present instance one series of these toothed gears being employed for actuation of each pair of endless carriers 44. As best shown in Figs. 3, 5 and 7, the wrist pin 54 is provided with a sprocket wheel 59 engaged by the chain $e$, and it will be understood that a revoluble movement of the operating shaft 10 will result in a revoluble movement of the wrist pin 54 on account of the engagement of the chain $e$ with sprocket wheels 52 and 59, also that a revoluble movement of the wrist pin 54 will result in the actuation of all of the engaging pinions 58 of a series. The upper ends of wrist-pins 54 and 57 are provided with sprocket wheels 60, and by the construction described the endless carriers of a pair will be moved as before stated for conducting the detached ears of corn from the inclined rectilinear arms of the frames 16 to the slides or hoppers 45. Numerals 61 indicate idler sprocket wheels mounted upon suitable brackets 62 near the curved front ends of frames 16 for a mounting of the endless carriers 44.

The weight of the transverse carrier 46 together with its frame is supported by the steering pole 8. Numerals 63 indicate hangers disposed parallel with the axle below the horizontal part $c$ of the carrier 46. It is suitably secured to the steering pole and by means of braces 64 the frame for the carrier 46 and its frames $c$ and $d$ is supported.

Numeral 65 indicates a sprocket wheel which is mounted on the operating shaft 10, and upon this wheel is mounted a sprocket chain 66. As best shown in Fig. 1, a shaft 67 has bearings in brackets 68 which are mounted on the frame $c$ and is provided with a miter gear 69 in engagement with the miter gear 70 of shaft 71, said shaft 71 being provided with wheels 72 for moving the carrier 46. A clutch 73 is provided and by means of a hand-lever 74 which may control the spring 75 and sprocket wheel 76 of said shaft 67, actuation of the carrier 46 may be terminated whenever required, suitable pull-rods 77 being employed for connecting the lever 74 with the clutch 73.

It will be understood that the function to be discharged by the springs 41 is to normally maintain the rear ends of the rollers together with the pinions 40 in engagement, and also to permit one of the rollers 39 of each pair to move transversely upon occasion, to prevent breakage, if indurate obstructions should enter between the rollers. Numeral 78 (Fig. 4) indicates a detent-rod which may have a slidable movement in the block 79 subject to the resistance of the spring 41 to permit the operation mentioned.

While I have explained the construction in detail, I do not wish to be understood as limiting myself in this respect and I may change the form, size and proportion of parts as well as minor details within the scope of the invention as claimed.

What I claim as my invention is,—

In a harvester, a main frame, wheels on which the frame is supported, a supplementary frame hingedly mounted on the main frame, U-shaped strips placed side by side on the supplementary frame with the closed curved portions disposed forwardly and downwardly to provide flaring jaws and with the sides of the strips separated to provide parallel channels to receive the stalks, pairs of shafts geared together for rotation in opposite directions journaled at their forward ends in the supplementary frame at opposite sides of the channels and having spiral ribs projecting laterally into the channels to engage the stalks, a bearing block on the supplementary frame adapted to receive the upper rear end of one of the shafts and having a guide space cut-away adjacent the bearing portion thereof, said block also having a transverse opening beneath the bearing portion, a bearing for the upper rear end of the companion shaft slidable transversely on said guide space, a rod slidable through the opening in the bearing block and having an upturned end to engage the second bearing, and resilient means associated with said rod.

In testimony whereof I have affixed my signature in presence of two witnesses.

EUGENE G. BARKER.

Witnesses:
ARTHUR H. STURGES,
HIRAM A. STURGES.